(12) United States Patent
Baudelocque

(10) Patent No.: US 8,357,862 B2
(45) Date of Patent: Jan. 22, 2013

(54) PRESSURIZED ROTARY MACHINE WITH HERMETICALLY SEALED CONNECTIONS

(75) Inventor: Luc Baudelocque, Vernon (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 422 days.

(21) Appl. No.: 12/556,173

(22) Filed: Sep. 9, 2009

(65) Prior Publication Data

US 2011/0017508 A1   Jan. 27, 2011

(30) Foreign Application Priority Data

Jul. 24, 2009   (FR) ...................................... 09 55220

(51) Int. Cl.
    *H02G 3/18* (2006.01)
(52) U.S. Cl. ........ 174/650; 239/274; 277/645; 277/646; 310/87; 310/88

(58) Field of Classification Search ..................... 174/24, 174/50.5, 68.1, 100, 650; 277/608, 609, 277/605, 645, 646; 310/87, 88, 905, 71
See application file for complete search history.

(56) References Cited

U.S. PATENT DOCUMENTS 2,658,939 A * 11/1953 Greenfield et al. ............. 174/24
5,390,702 A * 2/1995 Smith, III ................ 137/614.04

\* cited by examiner

*Primary Examiner* — Chau Nguyen
*Assistant Examiner* — Theron Milliser
(74) *Attorney, Agent, or Firm* — Weingarten, Schurgin, Gagnebin & Lebovici LLP

(57) ABSTRACT

Pressurized rotary machine comprising a canned or sleeved assembly of which the electrical connections are connected to the outside of the machine by an electric supply duct, the electrical connections passing from the canned or sleeved assembly to the outside via the electric supply duct by passing in succession through first, second and third hermetically sealed bushings, none of these hermetically sealed bushings through which the electrical connections pass being exposed to a pressurized gas.

11 Claims, 3 Drawing Sheets

PRESSURIZED ROTARY MACHINE WITH HERMETICALLY SEALED CONNECTIONS

FIELD OF THE INVENTION

The subject of the present invention is a pressurized machine equipped with a rotor in contact with a particle-laden, acidic or corrosive liquid or gaseous atmosphere and relates more specifically to a pressurized rotary machine equipped with sleeved magnetic bearings, with sleeved detectors for magnetic bearings and/or with a canned electric motor.

PRIOR ART

Sleeved magnetic bearings are generally used in pressurized rotary machines, commonly in a high-pressure gas environment. A sleeved magnetic bearing consists of a stator part comprised of wound cores placed in a protective metal enclosure consisting of an armature, of a thin sleeve and of a hermetically sealed passage, and filled with a filler which may serve to support the thin sleeve.

FIG. 3 depicts one example of a sleeved magnetic bearing 10 positioned inside a machine 12 containing pressurized gas. A connection socket 14 equipped with a hermetically sealed or fluidtight bushing 14a is installed on a protective metal enclosure 16 of the sleeved magnetic bearing 10 so that electrical connections can be led out. A flexible duct 18 equipped at one end with a connector 20 also provided with a hermetically sealed or fluidtight bushing 20a allows the electrical connections 22 of the sleeved magnetic bearing 10 to be connected to the outside of the machine via a further socket 24 provided with a hermetically sealed or fluidtight bushing 24a.

As shown by the enlarged detail of this figure, these hermetically sealed bushings are generally conductive passages crimped onto a metal wall by means of beads of glass in order to form either a connection socket or a mobile connector plug or simply a fluidtight electrical passage. The assembly is then welded or fixed hermetically to the wall using seals, welding, etc.

To prevent it from being crushed under the pressure of the ambient gas, the flexible duct is filled with oil or some other liquid so that the internal pressure inside the duct differs only very little from the gas pressure in the machine. Likewise, the duct is flexible enough to cope with the thermal expansion of the liquid. An access 26 communicating with the outside of the machine may allow the flexible duct to be filled with liquid.

The space between the two hermetically sealed bushings 14a and 20a is left in communication with the gas present in the machine if the quality of the gas is compatible with the nature of the electrical contacts or is hermetically sealed if the gas presents a risk to these contacts.

The disadvantage of a setup such as this is that there may be significant pressure differences between the gaseous media present and therefore it displays great sensitivity to the quality of the leak rates of each of the hermetic sealing barriers.

Hence, it is very difficult to achieve bushings 14a, 20a of the connection socket 14 of the magnetic bearing and of the connector 20 of the flexible duct 18 which have excellent leak rates, that is to say leak rates better than 1E-8 mbar.l/s (rates measured under helium at 1 bar gauge), just as it is very difficult reliably to achieve connection sockets and hermetically sealed connectors that have leak rates of this order. The standard orders of magnitude for the leak rates of such sockets are actually typically of the order of 1E-6 mbar.l/s. Very careful manufacture or sorting during the manufacturing process makes it possible to obtain hermetically sealed bushings with leak rates of the desired order of magnitude (<10E-8 mbar.l/s). However, these components are excessively fragile both in terms of fitting and in terms of durability, and their cost is very high. In addition, when the enclosure of the sleeved magnetic bearing has to be equipped with several bushings, the overall leak rate is the sum of the leak rates. The operations of fitting (soldering the wires to the rear of the bushing, welding the bushing to the protective enclosure, etc.) apply thermal or mechanical stresses to the glass beads which then lose some of their quality. The original leak rate is thereby adversely affected.

It therefore follows that, via residual leakages, ambient gas from inside the machine migrates into the magnetic bearing or into the canned or sleeved assembly through the various connections. As these leaks build up, they are liable to create an environment that is dangerous (corrosive, explosive, harmful, polluting, etc.) to or detracts from the life of the canned or sleeved assembly. Should the machine become depressurized, the internal pressure inside the canned or sleeved assembly may then exceed the ambient pressure, which then causes the enclosure to distend at the thin sleeve to the extent that the thin sleeve may be destroyed either through plastic deformation or through contact with the rotor armatures 28 of the rotor 30 as in the case of the sleeved axial magnetic bearing illustrated in FIG. 3. This is all the more dangerous if the gas is corrosive because the bearing can then also be destroyed by corrosion.

Typically, the pressure inside the sleeved bearing is of the order of one bar absolute (manufacturing pressure of the sleeved bearing) whereas the pressure of the gas inside the machine may be 100 to 200 bar. At this pressure, even if the space between the two bushings 14a and 20a is isolated by sealing gaskets 32, the gas pressure rapidly reaches it through the leak rate of these seals. Thereafter, the hermetically sealed bushing 14a of the connection socket 14 of the sleeved magnetic bearing 10 is subjected to a differential gas pressure substantially equal to the pressure of the machine. If this bushing does not have an excellent leak rate (far better than 1E-8 mbar.l/s), the pressure inside the sleeved magnetic bearing increases and this may lead to its destruction as explained hereinabove.

DEFINITION AND OBJECT OF THE INVENTION

The present invention sets out to overcome the aforementioned disadvantages and in particular to limit the leak rate of the hermetically sealed bushings so that there is no need to fear any migration of gas into the magnetic bearing or the canned or sleeved assembly.

These objects are achieved, according to the invention, by a pressurized rotary machine comprising a canned or sleeved assembly of which the electrical connections are connected to the outside of the said machine by an electric supply duct, the said electrical connections passing from the said canned or sleeved assembly to the outside via the said electric supply duct by passing in succession through first, second and third hermetically sealed bushings, characterized in that none of the said hermetically sealed bushings through which the said electrical connections pass is exposed to a pressurized gas.

Thus, by preventing each of the hermetically sealed bushings from experiencing a substantial gas pressure on one of its faces, it is no longer possible for gas to migrate and the fluidtightness of the connection is preserved. The volume of gas passing through the various sealing gaskets of the connection (which may then have a standard leak rate of the order of 1E-6 mbar.l/s) is then negligible. A raised liquid pressure on one of the faces presents no danger because a standard leak rate of the order of 1E-6 mbar.l/s under helium does not allow liquid to pass.

The said electric supply duct may be a rigid duct or alternatively a flexible duct, depending on the envisaged embodiment.

Advantageously, the said supply duct is filled with a liquid filler so as to keep the internal pressure inside the said electric supply duct identical to the internal pressure inside the machine. The said liquid filler may be a dielectric insulator.

A pressure compensating balloon may be added to keep the internal pressure inside the said electric supply duct identical to the internal pressure inside the machine.

As a preference, a valve is positioned or a drilling created across the said second hermetically sealed bushing so that the external pressure applied to the said first hermetically sealed bushing is created by the said liquid filler.

The invention is equally applicable to a sleeved magnetic bearing as it is to a sleeved detector for a magnetic bearing or to a canned electric motor. The medium external to the machine may be liquid.

BRIEF DESCRIPTION OF THE DRAWINGS

Further features and advantages of the invention will become apparent from reading the following description of some particular embodiments of the invention, which have been given by way of example with reference to the attached drawings in which.

DETAILED DESCRIPTION OF THE EMBODIMENTS

Figure 1:
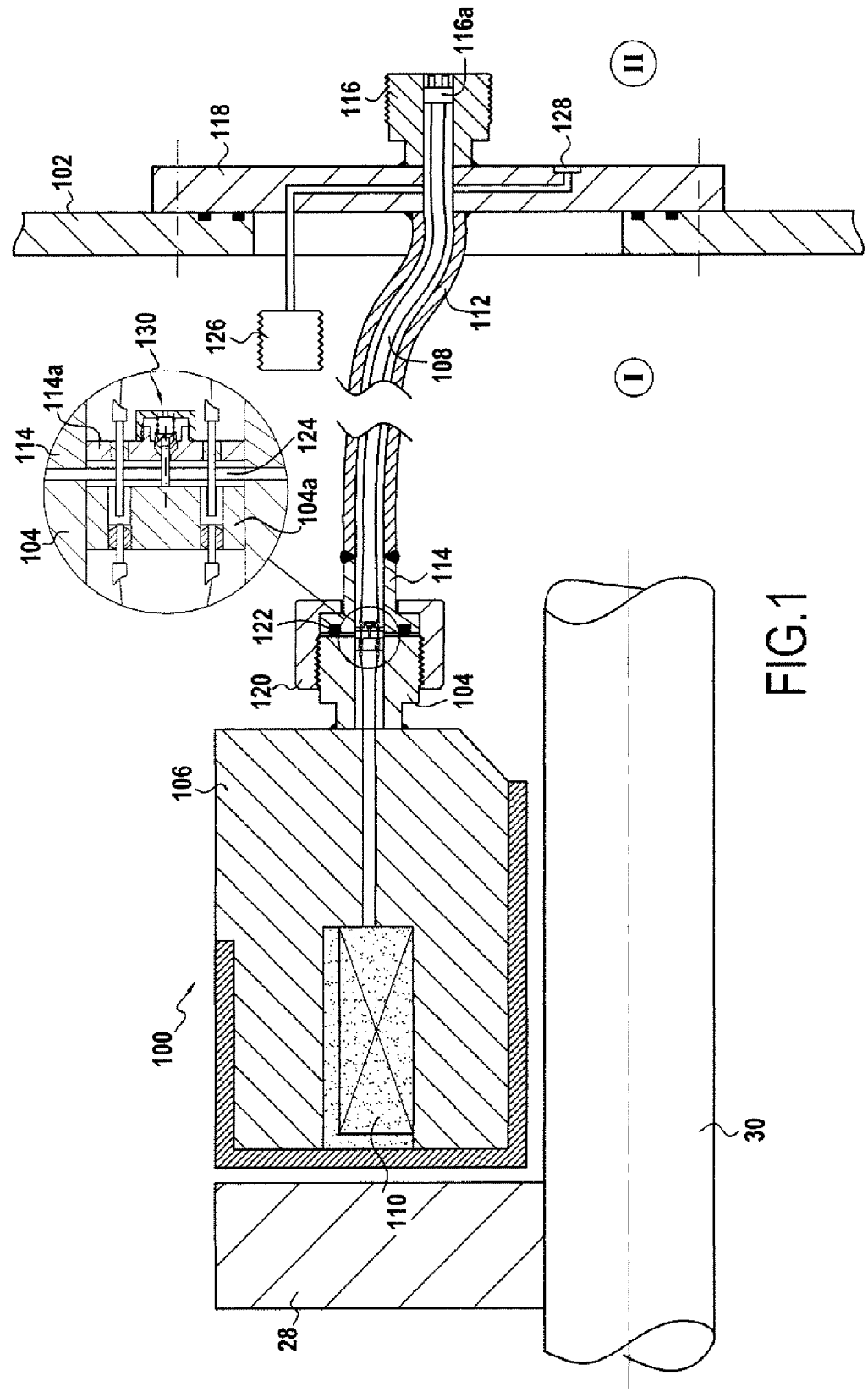
FIG. 1 is a schematic view of a first embodiment of the electrical connections connecting a sleeved magnetic bearing to the external wall of a rotary machine according to the invention.

FIG. 1 illustrates a first example, according to the invention, of how the electrical connection of a sleeved magnetic bearing 100 positioned inside a machine 102 containing pressurized gas is led to the outside (the ringed references I and II respectively denote the inside and the outside of the machine). As shown in greater detail in the enlarged detail of this figure, a connection socket 104 equipped with a hermetically sealed or fluidtight bushing 104a is installed on a protective metal enclosure 106 of the sleeved magnetic bearing 100, so as to lead out the electrical connections 108 needed to supply the windings 110 of the sleeved magnetic bearing. A flexible duct 112 equipped at one end with a connector 114, also equipped with a hermetically sealed or fluidtight bushing 114a, allows the electrical connections 108 to be connected to a connector (not depicted) external to the machine via a connection socket 116 at its other end which is likewise equipped with a hermetically sealed or fluidtight bushing 116a and mounted on a cover plate 118 of this machine. The mechanical connection between the connection socket 104 and the connector 114 is achieved by means of a nut 120 which also compresses an isolating gasket 122 positioned at the interface between these two elements and isolating the space 124 contained between the two hermetically sealed bushings 104a and 114a.

The flexible duct 112 is filled with oil or any other liquid such that its internal pressure differs only very little from the pressure of the gases in the machine, and is flexible enough to be compatible with the thermal expansion of the liquid. As a preference, a pressure compensating balloon 126 is installed on the cover plate 118 which also comprises an orifice 128 for communicating with the outside of the machine so that the flexible duct 112 can be filled with liquid.

According to the invention, the bushing 114a is made permeable to the liquid flowing through the flexible duct 112 so that the liquid fills the empty space 124 present between the bushings 104a and 114a. This liquid filler may be a dielectric insulator.

Because the pressure of the liquid is very nearly equal to the pressure of the gas inside the machine thanks to the flexibility of the duct 112 and/or the pressure compensating balloon 126, the sealing gasket 122 is subjected, on one side, to the gas and, on the other side, to the liquid, with a very small pressure difference that does not allow the gas to migrate into the empty space 124.

Further, the pressure across the bushing 104a is, on one side, a high liquid pressure from the flexible duct 112 and, on the other side, the internal pressure inside the sleeved bearing, typically equal to 1 bar. A bushing of standard manufacture (leak rate under helium of 1E-6 mbar.l/s) is therefore completely hermetically sealed against the liquid and there is no need to fear any migration into the sleeved magnetic bearing.

In the first exemplary embodiment illustrated in FIG. 1, the connector 114 comprises, for example at its middle, a valve 130 of which the opening, at the instant that the two elements 104 and 114 are assembled, places the internal volume of the duct 112 in communication with the space 124 between the bushings 104a and 114a.

When the flexible duct is connected to the connection socket 104 of the sleeved magnetic bearing, a small quantity of liquid comes to fill the space 124 between the hermetically sealed bushing of the socket which is situated on the sleeved magnetic bearing and the bushing of the connector of the flexible duct. The pressure compensating balloon 126 may assist with equalizing the internal pressure inside the duct with the ambient pressure. This balloon is needed only if the flexible duct is not supple enough (or is even rigid) to perform this role.

At the critical points of the connection socket 104a of the sleeved magnetic bearing there is then, on one side, a pressure of the order of one bar and, on the other side, the presence of pressurized oil. Bearing in mind the standard leak rate of the bushings (1E-6 mbar.l/s under 1 bar of helium) this represents a perfect hermetic seal against liquid and there is therefore absolutely no need to resort to special manufacture in order to obtain better leak rates.

Likewise, the hermetic sealing 114a of the bushing of the connector 114 fitted to the flexible duct 112 plays no further part in normal operation and is merely an aid to assembly to prevent the liquid from running out at the time of fitting.

Because the pressure in the space 124 between the bushings 104a and 114a is substantially equal to the internal pressure inside the machine, there is only a negligible pressure difference across the sealing gasket 122, making the migration of gas equally negligible with "standard" leak rates.

In another exemplary embodiment that has not been depicted, the bushing 104a is simply pierced. Of course, that entails not filling the duct 112 with liquid until after the elements 104 and 114 have been connected, using the filling orifice 128.

As a preference, the duct 112 is symmetric and the hermetically sealed bushing 116a installed on the cover plate 118 of the machine is similar to the hermetically sealed bushing 114a. It may be noted that when a pressure compensating balloon is provided, the duct 112 can then be less flexible, to the point of being rigid, it being possible for one and the same balloon to be used to equalize the pressure in several ducts.

Figure 2:
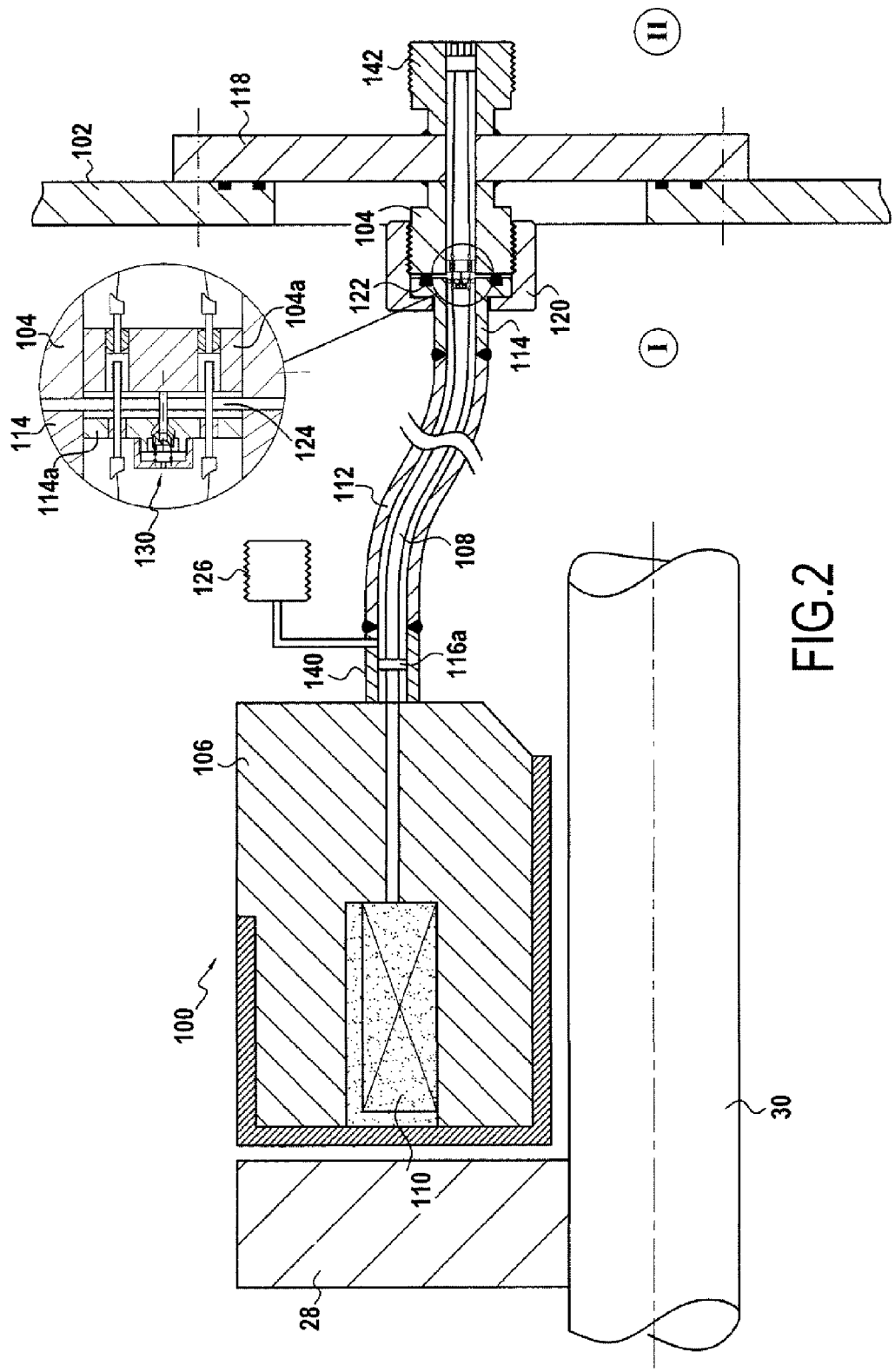
FIG. 2 is a schematic view of a second embodiment of the electrical connections connecting a sleeved magnetic bearing to the external wall of a rotary machine according to the invention.
Figure 3:
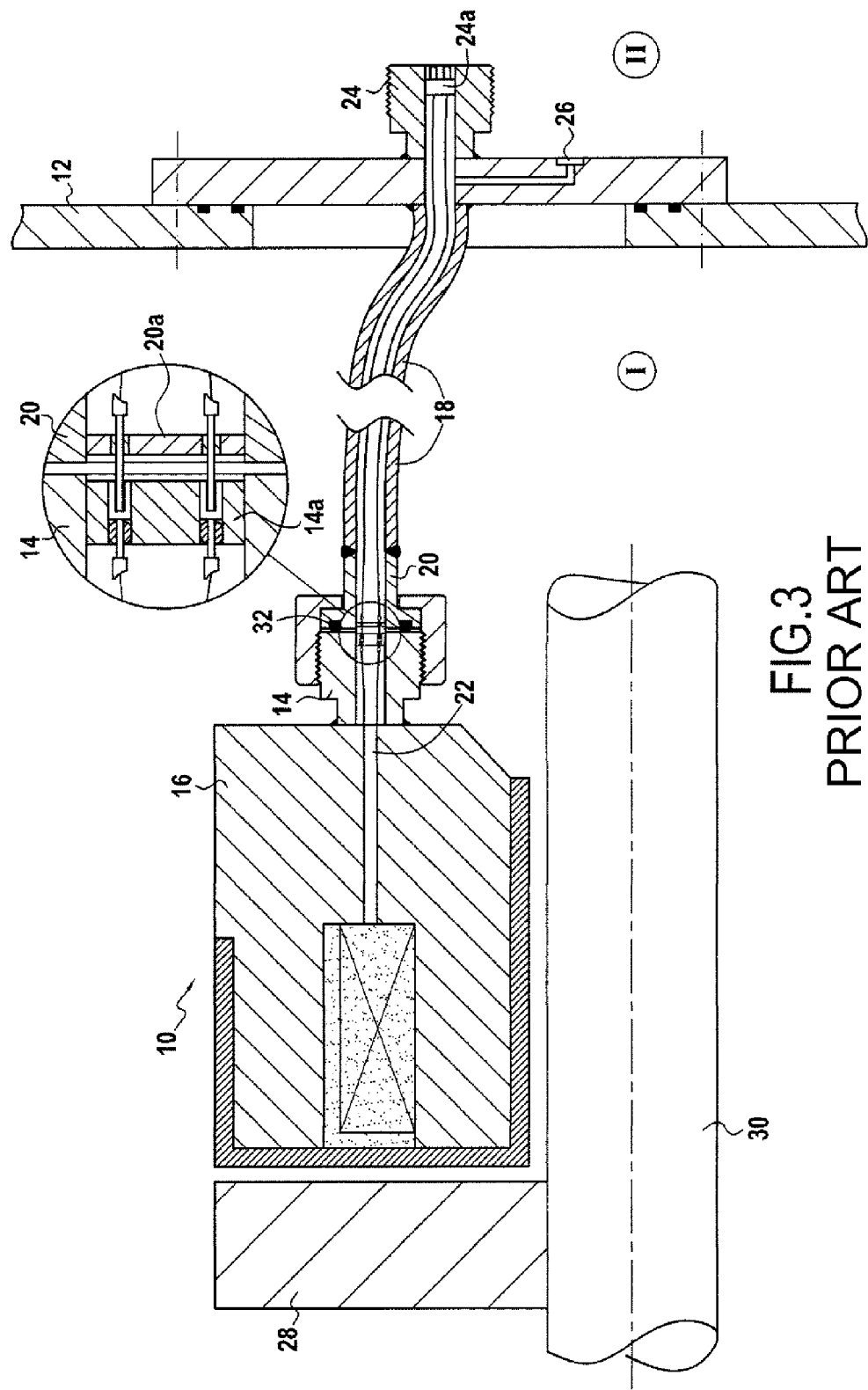
FIG. 3 is a schematic view of the electrical connections connecting a sleeved magnetic bearing to the external wall of a rotary machine according to the prior art.

FIG. 2 illustrates a second example, according to the invention, of how the electrical connection of a sleeved magnetic bearing 100 placed inside a machine 102 containing pressurized gas is led to the outside.

In this example, the connection socket 104 equipped with a hermetically sealed or fluidtight bushing 104a is installed not on the protective metal enclosure 106 but at the opposite end of the flexible duct 112 where it engages with a connector 114 likewise fitted with a hermetically sealed or fluidtight bushing 114a secured to the cover plate of the machine 118 and therefore allowing the electrical connections 108 to be connected to an external connection plug 142.

The mechanical connection between the connecting socket 104 and the connector 114 is, as before, achieved by way of a nut 120 which also compresses an isolating gasket 122 positioned at the interface between these two elements and isolating the space 124 between the two hermetically sealed bushings 104a and 114a.

The electrical connections 108 needed for supplying the windings 110 of the sleeved magnetic bearing are, for their part, now led out in a connecting part that adopts the form of a short rigid duct 140 as far as a bushing hermetically sealed against the liquid 116a which provides the connection with the electrical connections of the flexible duct to the end of which this short rigid duct is secured.

Thus, because the hermetically sealed bushing 116a serves no further function in normal operation, the pressure on one side of the canned or sleeved assembly is of the order of one bar and pressurized oil is present on the other side. Bearing in mind the standard leak rate of the bushings (1E-6 mbar.l/s under 1 bar of helium), that represents a perfect seal against the liquid and there is then absolutely no need to resort to special manufactures in order to obtain better leak rates.

The flexible duct 112 is filled with oil or any other liquid prior to assembly. Once assembly has been performed, the internal pressure inside the duct then differs only very slightly from the pressure of the gas in the machine, the duct being flexible enough to be compatible with the thermal expansion of the liquid. As a preference, a pressure compensating balloon 126 is also present but this time installed on the short rigid duct 140 that it crosses downstream of the hermetically sealed bushing 116a in order to communicate with the inside of the flexible duct 112.

Because of the presence of the valve 130, the bushing 114a is rendered permeable to the liquid flowing through the flexible duct 112 such that the liquid fills the empty space 124 present between the bushings 104a and 114a.

Because the pressure of the liquid is very nearly equal to the pressure of the gas inside the machine thanks to the flexibility of the duct 112 and/or the pressure compensating balloon 126, the sealing gasket 122 is subjected on one side to the gas and on the other side to the liquid with a very small pressure difference that does not allow the gas to migrate into the empty space 124.

Furthermore, the pressure across the bushing 104a is, on one side, a high liquid pressure from the flexible duct 112, and, on the other side, atmospheric pressure from the outside, typically equal to 1 bar. A bushing of standard manufacture (leak rate under helium of 1E-6 mbar.l/s) is therefore completely hermetically sealed against the liquid and there is no need to fear any migration to the outside.

The invention claimed is:

1. Pressurized rotary machine having an inside and an outside, and including a high-pressurized gas on the inside, comprising:
   a canned or sleeved assembly in the inside including electrical connections connected to the outside of the machine through an electric supply duct;
   the electrical connections further passing through at least first and second sealed bushings, the first and second sealed bushings separated by a space subject to migration of the high-pressurized gas; and
   the electric supply duct filled with a pressurized liquid filler that has a pressure that differs only slightly from the high-pressurized gas, the pressurized liquid filler extending in the space between the first and second sealed bushings, the pressurized liquid filler isolating the first and second sealed bushings from the high-pressurized gas on the inside of the machine.

2. Machine according to claim 1, characterized in that the electric supply duct is a flexible duct.

3. Machine according to claim 1, characterized in that the electric supply duct is a rigid duct.

4. Machine according to claim 1, characterized in that the pressure of the pressurized liquid filler inside the electric supply duct is identical to the internal pressure inside the machine.

5. Machine according to claim 4, characterized in that it further comprises a pressure compensating balloon to keep the internal pressure inside the electric supply duct identical to the internal pressure inside the machine.

6. Machine according to claim 4, characterized in that the liquid filler is a dielectric insulator.

7. Machine according to claim 4, characterized in that a valve is positioned or a drilling created across the second sealed bushing so that the external pressure applied to the first sealed bushing is created by the liquid filler.

8. Machine according to claim 1, characterized in that the canned or sleeved assembly is a sleeved magnetic bearing.

9. Machine according to claim 1, characterized in that the canned or sleeved assembly is a sleeved detector for a magnetic bearing.

10. Machine according to claim 1, characterized in that the canned or sleeved assembly is a canned electric motor.

11. Machine according to claim 1, characterized in that the medium external to the machine is liquid.

* * * * *